(12) United States Patent
Colombi et al.

(10) Patent No.: US 9,831,675 B2
(45) Date of Patent: Nov. 28, 2017

(54) SYSTEM FOR COMMON REDUNDANT BYPASS FEED PATHS IN UNINTERRUPTIBLE POWER SUPPLIES

(71) Applicants: Silvio Colombi, Ticino (CH); Lorenzo Giuntini, Ticino (CH)

(72) Inventors: Silvio Colombi, Ticino (CH); Lorenzo Giuntini, Ticino (CH)

(73) Assignee: General Electric Company, Schenectady, NY (US)

( * ) Notice: Subject to any disclaimer, the term of this patent is extended or adjusted under 35 U.S.C. 154(b) by 788 days.

(21) Appl. No.: 13/727,762

(22) Filed: Dec. 27, 2012

(65) Prior Publication Data
US 2014/0183955 A1    Jul. 3, 2014

(51) Int. Cl.
H02J 9/00    (2006.01)
H02J 3/38    (2006.01)
H02J 9/06    (2006.01)

(52) U.S. Cl.
CPC ............. H02J 3/38 (2013.01); H02J 9/062 (2013.01); *Y02P 80/14* (2015.11); *Y02P 80/152* (2015.11); *Y10T 307/615* (2015.04)

(58) Field of Classification Search
USPC .................................................... 307/63–67
See application file for complete search history.

(56) References Cited

U.S. PATENT DOCUMENTS

| | | |
|---|---|---|
| 5,138,184 A | 8/1992 | Keefe |
| 5,229,651 A | 7/1993 | Baxter, Jr. et al. |
| 5,377,092 A | 12/1994 | Rowand, Jr. et al. |
| 5,747,887 A | 5/1998 | Takanaga et al. |
| 5,969,962 A | 10/1999 | Gabor |
| 6,292,379 B1 | 9/2001 | Edevold et al. |

(Continued)

FOREIGN PATENT DOCUMENTS

| | | |
|---|---|---|
| CN | 101395782 A | 3/2009 |
| CN | 202034819 U | 11/2011 |
| WO | 2004038892 | 6/2004 |

OTHER PUBLICATIONS

Palma, L.B et al., Real-time detection of oscillations in control loops, Power Engineering, Energy and Electrical Drives (POWERING), International Conference on , May 2011, vol., No., pp. 1-6, 11-13.

(Continued)

*Primary Examiner* — Danny Nguyen
(74) *Attorney, Agent, or Firm* — Fletcher Yoder, P.C.

(57) ABSTRACT

An uninterruptible power supply (UPS) system includes an inverter feed path and a plurality of bypass feed paths configured to couple to an AC voltage source such that each bypass feed path includes a switch configured to couple the AC voltage source to the load when closed. The switch in each bypass feed path may be rated to conduct current that corresponds to an output of the inverter feed path. Each bypass feed path may be coupled in parallel with each other and the inverter feed path. The UPS system may also include at least one controller coupled to a respective inverter and to a respective rectifier in the inverter feed path and a plurality of controllers. Each controller may be coupled to a respective switch such that the at least one controller and the plurality of controllers communicate with each other via at least two communication buses.

18 Claims, 3 Drawing Sheets

(56) References Cited

U.S. PATENT DOCUMENTS

| | | |
|---|---|---|
| 6,433,444 B1 | 8/2002 | de Vries |
| 6,525,497 B2 | 2/2003 | Lee et al. |
| 6,629,064 B1 | 9/2003 | Wall |
| 6,940,187 B2 | 9/2005 | Escobar et al. |
| 7,129,599 B2 | 10/2006 | Divan et al. |
| 7,265,458 B2 | 9/2007 | Edelen et al. |
| 7,372,177 B2 | 5/2008 | Colombi et al. |
| 7,432,615 B2 | 10/2008 | Hjort |
| 7,456,520 B2 | 11/2008 | Colombi et al. |
| 7,638,899 B2 | 12/2009 | Tracy et al. |
| 8,036,872 B2 | 10/2011 | Nasle |
| 8,089,789 B2 | 1/2012 | Prasad et al. |
| 2003/0048006 A1 | 3/2003 | Shelter, Jr. et al. |
| 2005/0200205 A1 | 9/2005 | Winn et al. |
| 2005/0275976 A1 | 12/2005 | Taimela et al. |
| 2006/0167569 A1 | 7/2006 | Colombi et al. |
| 2008/0192877 A1 | 8/2008 | Eliezer et al. |
| 2009/0009001 A1* | 1/2009 | Marwali et al. ............. 307/65 |
| 2009/0201703 A1 | 8/2009 | Klikic et al. |
| 2010/0102636 A1 | 4/2010 | Tracy et al. |
| 2012/0033323 A1 | 2/2012 | Mathew et al. |

OTHER PUBLICATIONS

Tolbert, L.M et al., Survey of harmonics measurements in electrical distribution systems, Industry Applications Conference, Oct. 1996, IEEE, vol. 4, No., pp. 2333-2339 vol. 4, 6-10.

Rech, C. et al., Line current harmonics reduction in multipulse connection of asymmetrically loaded rectifiers, Industry Applications Conference, Industrial Electronics, IEEE Transactions on , Jun. 2005, vol. 52, No. 3, pp. 640-652.

Palma, L.B et al., Real-time detection of oscillations in control loops, Power Engineering, Energy and Electrical Drives (POWERING), International Conference on , May 2011 vol., No., pp. 1-6, 11-13.

O'Connor, N. et al., Control loop performance assessment: a classification of methods, Proceedings of the Irish Signals and Systems Conference, Jul. 2004, pp. 530-535.

A unofficial translation of CN Office Action and Search Report issued in connection with corresponding CN Application No. 201310741417.9 dated Dec. 27, 2016.

* cited by examiner

SYSTEM FOR COMMON REDUNDANT BYPASS FEED PATHS IN UNINTERRUPTIBLE POWER SUPPLIES

BACKGROUND

The subject matter disclosed herein relates to systems for high-reliability bypass for multi-mode uninterruptible power supply (UPS) systems (e.g. double-conversion, ECO mode, etc.).

UPS systems are employed in a variety of applications to provide a constant source of voltage for a load. Some UPS systems include an inverter feed path that is connected in parallel with a bypass feed path. In a normal mode of operation, the UPS system may feed power to the load via the inverter feed path, which converts power from a power source into direct current (DC) power using a rectifier. The rectifier then provides the DC power to an inverter, which converts the DC power into a controllable alternating current (AC) power. The UPS system may then provide the controllable AC power to the load. Generally, the bypass feed path provides power to the load via a utility power source. As such, the bypass feed path provides the UPS system with another means for providing power to the load when the inverter feed path fails or is isolated for maintenance. In some situations, multiple UPS systems may be coupled in parallel to provide redundancy and/or extra power to the load. Conventional parallel implementations feature either a distributed bypass (i.e., every UPS system features its own bypass path) or a centralized bypass (i.e., single, separate bypass path while the various UPS systems only embed the rectifier-inverter path). Each approach has its drawbacks. The main disadvantages of distributed bypass are complexity, cost and footprint, while the centralized bypass offers limited reliability but lacks redundancy. Accordingly, improved systems and methods for bypass feed paths in parallel UPS installations are desirable.

BRIEF DESCRIPTION

In one embodiment, an uninterruptible power supply (UPS) system may include at least one inverter feed path configured to couple to an alternating current (AC) voltage source such that the at least one inverter feed path may include a rectifier configured to receive AC voltage from the AC voltage source and an inverter configured to output a controllable AC voltage to a load. The UPS system may also include a plurality of bypass feed paths configured to couple to the AC voltage source such that each bypass feed path of the plurality of bypass feed paths comprises a switch configured to couple the AC voltage source to the load when closed. The switch in each bypass feed path may be rated to conduct current that corresponds to an output of the inverter feed path. Each bypass feed path may be coupled in parallel with each other such that the plurality of bypass feed paths may be coupled in parallel with the at least one inverter feed path. The UPS system may also include at least one controller coupled to a respective inverter and to a respective rectifier in the at least one inverter feed path and a plurality of controllers. Each of the plurality of controllers may be coupled to a respective switch in a respective bypass feed path of the plurality of bypass feed paths such that the at least one controller and the plurality of controllers communicate with each other via at least two communication buses.

In another embodiment, a method may include monitoring, using a processor, a plurality of currents conducting through a plurality of bypass feed paths such that each bypass feed path may be configured to couple an AC voltage source to a load using a static switch module configured to couple an AC voltage source to a load. The method may also include determining whether at least one static switch module in the plurality of bypass feed paths has failed and sending a signal to a plurality of controllers to provide power to the load using a plurality of inverter feed paths when the at least one static switch module in the plurality of bypass feed paths fails. Each inverter feed path may be coupled in parallel with each other and may include a rectifier and an inverter. The plurality of controllers may include a first portion of the controllers each coupled to a respective rectifier and a respective inverter in the plurality of inverter feed paths and a second portion of the controllers each coupled to a respective static switch module in the plurality of bypass feed paths.

In yet another embodiment, a controller may be configured to couple to a first rectifier and to a first inverter in a first inverter feed path configured to convert an alternating current (AC) voltage from an AC voltage source into a controllable AC voltage configured to couple to a load. The controller may also be configured to communicate with a plurality of other controllers via a plurality of communication buses such that each of the plurality of other controllers is configured to respectively couple to another rectifier and another inverter in another inverter feed path coupled in parallel with the first inverter feed path, a static switch module in a bypass feed path configured to provide the AC voltage from the AC voltage source to the load, or a combination thereof. The controller may then be configured to send a signal to a respective other controller coupled to the static switch module, wherein the signal is configured to open the static switch module when a quality of the AC voltage is not within tolerance levels.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards a redundant bypass configuration for an uninterruptible power supply (UPS) system. Generally, the UPS system of this disclosure may include multiple inverter feed paths that convert alternating current (AC) voltage into a controllable AC voltage using rectifiers, direct current (DC) energy storage (typically batteries), and inverters. The UPS system may also include multiple bypass feed paths that provide AC voltage to a load via an AC power source. In certain embodiments, the UPS system may be configured such that each inverter feed path may be coupled to each other in parallel. Similarly, each bypass feed path in the UPS system may be coupled to each other in parallel. The parallel inverter feed paths may then be coupled in parallel to the parallel-connected bypass feed paths. Each of the inverter and bypass feed paths in the UPS system may include a controller. The controllers associated with the multiple inverter and bypass feed paths may communicate with each other via a redundant communication bus. As such, the communication between the controllers in the UPS system may have a peer-to-peer structure, which provides a redundant communication system to manage the operations of the UPS system's inverter and bypass feed paths. Additional details with regard to the redundant bypass configuration for the UPS system are described below with reference to FIG. 1-3.

Figure 1:
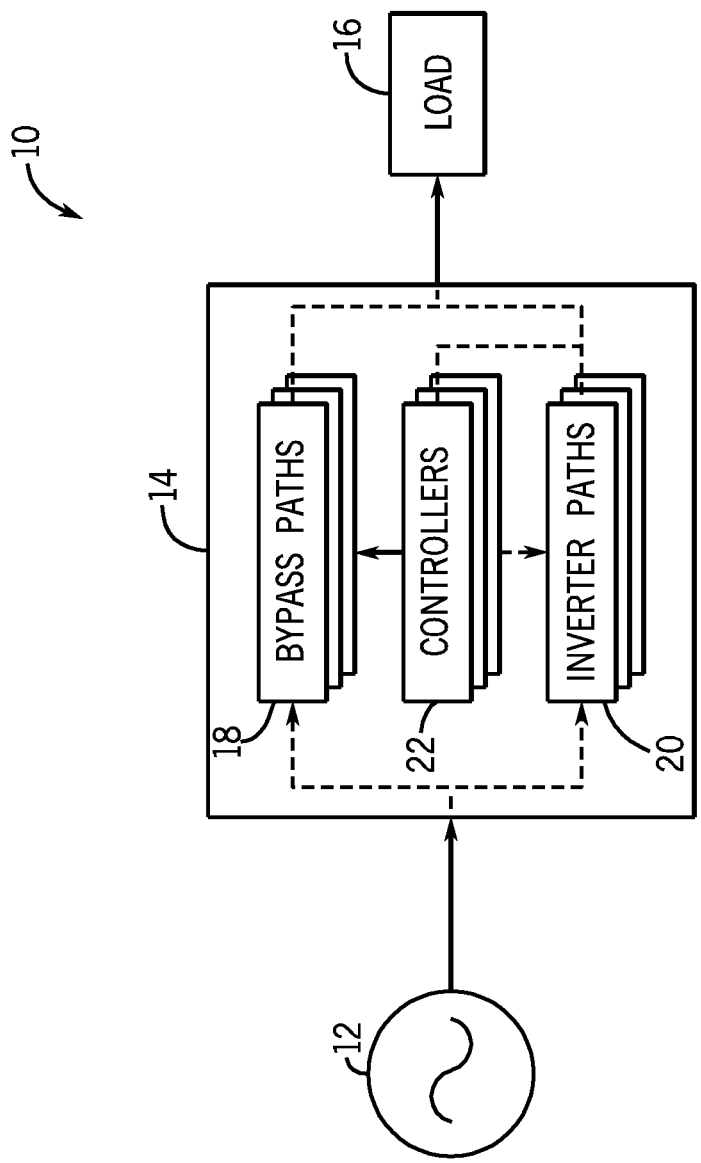
FIG. 1 illustrates a block diagram of an uninterruptible power supply (UPS) system, in accordance with an embodiment.

Referring now to the figures, FIG. 1 illustrates a block diagram of a UPS system 10 that may include an alternating current (AC) power source 12, a UPS 14, and a load 16. The AC power source 12 may be a utility power source or some other AC power source. The AC power source 12 may provide the UPS 14 with AC voltage that may be used to provide power to the load 16. The UPS 14 may include a number of bypass feed paths 18 and inverter feed paths 20 that may be used to transfer power from the AC power source 12 to the load 16. Although the bypass feed paths 18 and the inverter feed paths 20 are depicted in FIG. 1 as being coupled to an AC power source 12, it should be noted that in other embodiments the power source for the inverter feed paths 20 may be different from the power source for the bypass feed paths 18.

In one embodiment, the bypass paths 18 and inverter paths 20 may be coupled to a number of controllers 22, which may monitor various electrical aspects (e.g., voltage and current) of the UPS 14. The controllers 22 may also control how current may be conducted through the UPS 14. That is, the controllers 22 may enable current from the AC power source 12 to conduct through one or more bypass feed paths 18 or one or more inverter feed paths 20.

Figure 2:
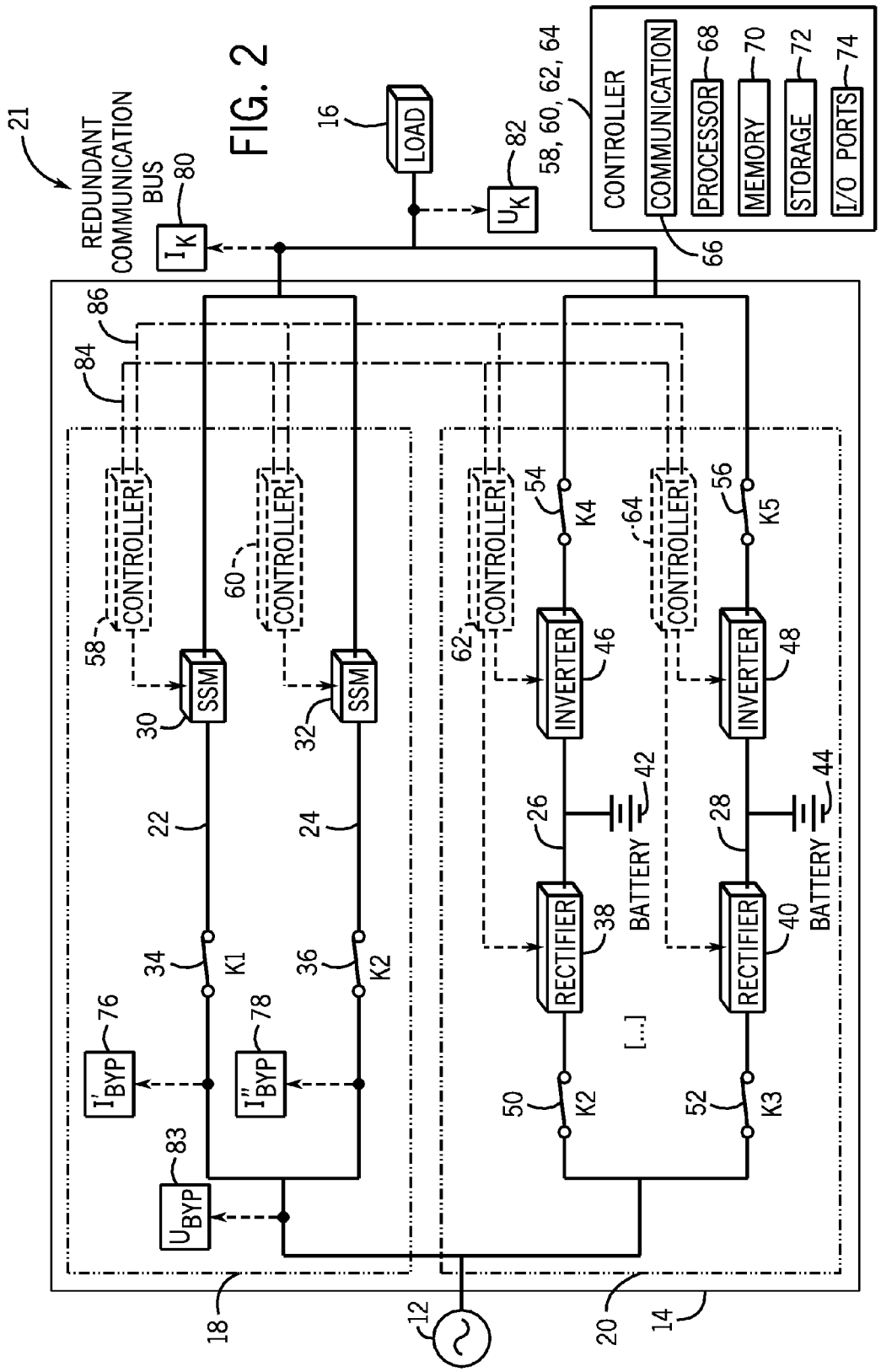
FIG. 2 illustrates a one-line diagram of a redundant bypass configuration for the UPS system of FIG. 1, in accordance with an embodiment.

Keeping the foregoing in mind, FIG. 2 depicts a one-line diagram of a redundant bypass configuration 21 for the UPS system 10. As mentioned above, the UPS system 10 includes multiple bypass feed paths 18 (e.g., bypass feed paths 22 and 24) and multiple inverter feed paths 20 (e.g., inverter feed paths 26 and 28). In one embodiment, the bypass feed path 22 and the bypass feed path 24 may be coupled together such that they may be operable in parallel and each bypass feed path 22 or 24 may independently be capable of providing power to the load 16. As such, each bypass feed path 22 or 24 may include a switch 30 and 32, such as a static switch module (SSM). Each switch 30 or 32 may be rated to conduct enough current from the AC power source 12 to feed the entire (e.g., 100%) load 16.

In one embodiment, the switches 30 and 32 may include SSMs that use Integrated Gate-Commutated Thyristors (IGCTs) to switch on and off. By using IGCTs within the switches 30 and 32, the UPS 14 may provide more efficient transfers between using the bypass feed paths 22 and 24 and the inverter feed paths 26 and 28. That is, since IGCTs are forced-commutation devices, the switches 30 and 32 do not turn off just at the zero-crossing of the AC current conducting through the switches 30 and 32. Instead, the switches (30 and 32) may turn off in a more controlled manner. As such, power may be provided to the load 16 via the inverter feed paths 26 and 28 instead of the bypass feed path 22 or 24.

Generally, IGCTs are high-efficiency power switches that have low on-state voltage and low total power losses (i.e., about 50% of conventional gate turn-off (GTO) thyristor). Additionally, IGCTs enable the switches 30 and 32 to be fuse-less and snubber-less, thereby further increasing its efficiency characteristics. As such, by using the IGCTs in the switches 30 and 32, the UPS 14 may decrease the total power loss in the UPS system 14. Although the switches 30 and 32 have been described as using IGCTs, it should be noted that in other embodiments other types of forced commutation devices (e.g., gate turn-off thyristors) may also be used in the switches 30 and 32.

Since each bypass feed path 22 and 24 is capable of supporting the entire load 16, the two bypass feed paths 22 and 24 provide a redundant means for powering the load 16 via the AC power source 12. That is, if one bypass feed path (e.g., 22) becomes unavailable or stops functioning, the other bypass feed path (e.g., 24) may be capable of feeding the entire load 16. In addition to switches 30 and 32, the bypass feed paths 22 and 24 may include switches 34 and 36, which may be used to isolate the AC power source 12 from each bypass feed path 22 and 24 and provide additional protection and/or control along the bypass feed paths 22 and 24. Further, since each bypass feed path 22 and 24 is fully rated for the entire parallel system of the inverter feed paths 26 and 28, the two bypass feed paths 22 and 24 may be combined (i.e., operate in parallel) at certain times to accommodate extreme system overloads and the like. For example, since each bypass feed path 22 and 24 is fully rated for the entire parallel system of the inverter feed paths 26 and 28, the bypass feed paths 22 and 24 may both operate to accommodate a continuous overload condition of up to approximately 200% of the rated load 16.

Turning now to the inverter feed paths 26 and 28, each inverter feed path 26 or 28 may include a rectifier 38, 40, a battery 42, 44, and an inverter 46, 48. As such, the rectifier 38, 40 may receive AC voltage from the AC power source 12 and convert it into DC voltage to charge the battery 42, 44 as well as supply DC power to the inverter 46, 48. The inverter 46, 48 may then convert the DC voltage into a controllable AC voltage. The controllable AC voltage may then be provided to the load 16. Each inverter feed path 26 and 28 may simultaneously operate to feed the entire load 16. In this manner, inverter feed paths 26 and 28 may be coupled together in parallel for reliability or capacity such that the UPS 14 may be scaled to any rating.

Like the bypass feed paths 22, 24, the inverter feed paths 26 and 28 may include switches 50, 52, 54, and 56, which may be used to isolate the AC power source 12 from each inverter feed path 26 and 28 and provide additional protection and/or control along the inverter feed paths 26 and 28. Additionally, the switches 50, 52, 54, and 56 may be used to scale the output voltage ($U_k$) provided to the load 16. That is, each inverter feed path 26 and 28 may provide a particular output voltage ($U_k$) to the load 16, and the switches 50, 52, 54, and 56 may be engaged such that the output voltage ($U_k$) provided to the load 16 meets some value.

In some embodiments, the UPS 14 may use the bypass feed path 22, 24 and the inverter feed path 26, 28 to operate in an economic (e.g., ECO) mode and a normal mode, respectively. That is, the UPS 14 may operate in the ECO mode by engaging the switch 30 or 32 (i.e., closing) such that a bypass current may be delivered to the load 16 from the power source 12. Similarly, the UPS 14 may operate in the normal mode by engaging switches 50 and 54 or 52 and 56 (i.e., closing) such that an inverter current may be delivered to the load 16 from the power source 12.

Each switch 30 and 32 mentioned above may be coupled to a controller 58 and 60 that may control how the power from the AC power source 12 may conduct through the UPS system 14 via the bypass feed paths 22 and 24. Similarly, each rectifier 38 and 40 and inverter 46 and 48 may be coupled to a controller 62 and 64 that may control how the power from the AC power source 12 may conduct through the UPS 14 via the inverter feed paths 26 and 28. Although each controller 58, 60, 62, 64 has been described as being coupled to either a rectifier 38 or 40 and an inverter 46 or 48 or to a switch 30 and 32, in some embodiments, each controller may be coupled to the respective rectifier 38 or 40, inverter 46 or 48, and the switch 30 or 32 in the inverter and bypass feed paths.

Each controller 58, 60, 62, or 64 may include a communication component 66, a processor 68, a memory 70, a storage 72, input/output (I/O) ports 74, and the like. The communication component 66 may be a wireless or wired communication component that may facilitate communication between various components (e.g., switches, rectifier, inverter) within the UPS 14. The processor 68 may be any type of computer processor or microprocessor capable of executing computer-executable code. The memory 70 and the storage 72 may be any suitable articles of manufacture that can serve as media to store processor-executable code. These articles of manufacture may represent computer-readable media (i.e., any suitable form of memory or storage) that may store the processor-executable code used by the processor 68 to perform the presently disclosed techniques. In one embodiment, each controller 58, 60, 62, and 64 may receive data related to various characteristics of the UPS 14 from any sensor suitable for the intended purpose. For example, each controller 58, 60, 62, and 64 may receive data related to a current signal (e.g., $I'_{byp}$ 76, $I''_{byp}$ 78) conducting through each bypass feed path 22 or 24, a current signal (e.g., $I_k$ 80) provided to the load 16, a voltage signal ($U_k$) 82 provided to the load 16, a voltage signal ($U_{byp}$) 83 output by the power source 12, and the like.

The controllers 58, 60, 62, or 64 may communicate with each other using at least two communication buses 84 and 86. As such, the controllers 58, 60, 62, or 64 may have a redundant communication bus to enable the controllers 58, 60, 62, or 64 to continue communicating with each other and controlling how the AC power may conduct to the load 16 if one of the two communication buses 84 and 86 fails to operate. The redundant communication bus thereby implements a peer-to-peer structure that prevents a single point failure, which may occur in master-slave communication techniques.

Keeping the foregoing in mind, when switching between ECO and normal modes of operation, controllers 58, 60 may send signals to the IGCTs in the switches 30 and 32 such that the switches 30 and 32 may immediately turn off after receiving a turn off signal from its respective controller 58 or 60. That is, by using the IGCTs in the switches 30 and 32, the controllers 58 and 60 can force the switches 30 and 32, as opposed to waiting for when the current's waveform crosses zero. As a result, the transfer times when switching between the ECO and normal modes may be quicker relative to using other semiconductor devices in the switches 30 and 32.

In one embodiment, at least one of the controllers 58, 60, 62, 64 may monitor the quality (e.g., harmonics, noise, distortion) of the voltage ($U_{byp}$) 83 output by the power source 12. If the quality of the voltage ($U_{byp}$) 83 is not within certain tolerance levels, at least one of the controllers 58, 60, 62, 64 may switch the UPS 14 from operating in the ECO mode to the normal mode. That is, at least one of the controllers 58, 60, 62, 64 may send a first signal to the switch 30 or 32 that is currently closed to open and send a second signal to the controllers 62 and 64 associated with the inverter feed paths 26 and 28 to conduct current from the power source 12 to the load 16. Since the controllers 58, 60 can turn the switches 30 and 32 off in a more controlled and near instantaneous manner using the IGCTs in the switches 30 and 32, the UPS 14 may effectively switch between the ECO and normal modes more quickly. As such, the controllers 58, 60 may ensure that the load 16 is not exposed to poor output voltage ($U_k$) 82 quality for long periods of time. Moreover, the total losses in the switches 30 and 32 using IGCTs may be smaller relative to using other types of semiconductor devices in the switches 30 and 32.

In certain embodiments, the controllers 58, 60 may operate in a cyclical operation scheme to increase the efficiency of each bypass feed path 22 and 24. That is, the controllers 58, 60 may alternate between each bypass feed path 22 and 24 when operating in the ECO mode. As such, the controllers 58 and 60 may increase the component life of each component in each bypass feed path 22 and 24, reduce stress applied on each component in each bypass feed path 22 and 24, reduce operating hours for each component in each bypass feed path 22 and 24, and so forth.

In addition to maximizing the efficiency in using each bypass feed path 22 and 24, the controllers 58, 60 may monitor the bypass currents 76, 78 and detect whether the switches 30, 32 have failed. Additional details with regard to detecting whether the switches 30, 32 have failed will be described below with reference to FIG. 3.

While FIGS. 1-2 depict the UPS system 14 in a one-line diagram form, it should be noted that in certain embodiments, the UPS system 14 may have multiple phases, such as three phases. For example, the output AC power ($U_k$) provided to the load 16 may include any number of phases (e.g., $u_1$, $u_2$, $u_3$). As such, any reference made herein to a current or a voltage in one phase is intended to be a reference to the current and voltage of each phase.

Figure 3:
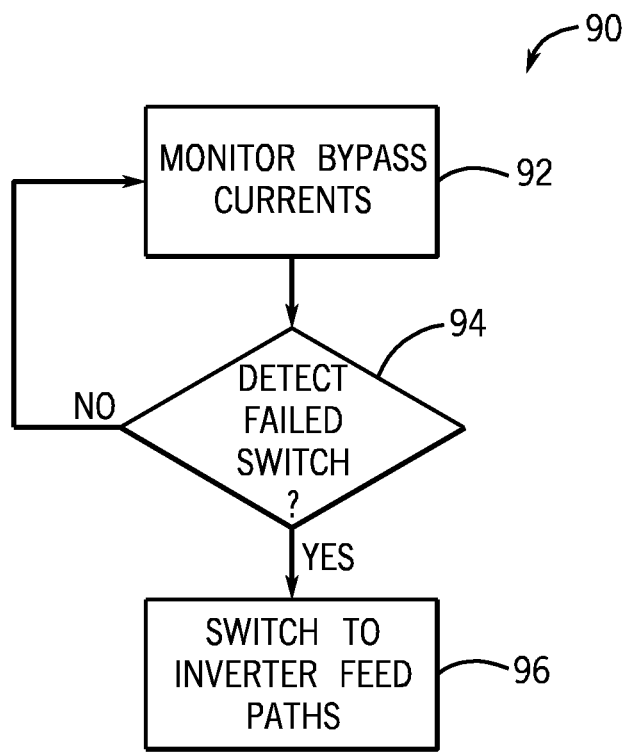
FIG. 3 illustrates a flow chart for operating the UPS system of FIG. 1, in accordance with an embodiment.

FIG. 3 illustrates a flow chart for operating the UPS system 10. In particular, the flow chart of FIG. 3 illustrates a method 90 for determining when the UPS 14 should switch between operating in the ECO and normal modes. In certain embodiments, any of the controllers 58, 60, 62, and 64 or multiple controllers may perform the method 90.

At block 92, the controllers 58, 60, 62, and 64 may monitor the current $I'_{byp}$ 76, $I''_{byp}$ 78 conducting through each bypass feed path 22 and 24. As such, the UPS 14 may be operating in the ECO mode by providing power to the load 16 via the AC power source 12.

At block 94, the controllers 58, 60, 62, and 64 may determine whether any switch 30 and 32 on the bypass feed paths 22 or 24 have failed. In one embodiment, if the switch 30 or 32 is designated as "off" or in an open position and the controllers 58, 60, 62, and 64 receive signals that indicate that a current is indeed conducting through its respective bypass feed path 22 or 24, the controllers 58, 60, 62, and 64 may determine that the corresponding switch 30 or 32 has failed as a potential short circuit, which may back-feed power towards the bypass input. In another embodiment, if both switches 30 and 32 in the bypass feed paths 22 and 24 are designated as being "on" or in closed positions and the controllers 58, 60, 62, and 64 receive signals that indicate that currents conducting through the each of the bypass feed paths 22 and 24 differ substantially, the controllers 58, 60, 62, and 64 may determine that one of the switches 30 or 32 may have failed to open. In yet another embodiment, the controllers 58, 60, 62, and 64 may control the amount of current being conducted via each bypass feed path such that each bypass feed paths may share loads (including overloads) relatively equally. As such, the controllers 58, 60, 62, and 64 may be designed to ensure that the amount of current conducted via each bypass feed path is relatively balanced across an entire operating range.

If, at block 94, the controllers 58, 60, 62, and 64 determine that any switch on the bypass feed paths 22 or 24 have not failed, the controllers 58, 60, 62, and 64 may return to block 92 and continue monitoring the current $I'_{byp}$ 76, $I''_{byp}$ 78 conducting through each bypass feed path 22 and 24. If, however, the controllers 58, 60, 62, and 64 determine that any switch on the bypass feed paths 22 or 24 has failed, the controllers 58, 60, 62, and 64 may proceed to block 96.

At block 96, the controllers 58, 60, 62, and 64 may operate the UPS 14 in the normal mode. That is, the controllers 58, 60, 62, and 64 may send signals to the switches 30 and 32 to open and send signals to the rectifiers 38 and 40 and the inverters 46 and 48 to supply the load 16 with the output voltage $U_k$.

Technical effects of the present disclosure include providing a redundant UPS system that offers improved reliability. Additionally, since the switches 30 and 32 may include the use of forced-commutation devices (e.g. IGCT), the transfer between ECO and normal modes of operation in the UPS 14 may occur more quickly, thereby improving transfers between operation mode. Further, technical effects of the present disclosure include providing greater protection for the load 16, especially during continuous bypass operation such as in the ECO mode. Moreover, by operating the UPS system in a cyclical mode, the UPS may have improved efficiency while maximizing its components' operational lives.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An uninterruptible power supply (UPS) system, comprising:
   a rectifier configured to couple to an alternating current (AC) voltage source;
   an inverter configured to couple to the rectifier and configured to output a controllable AC voltage to a load;
   a plurality of switches configured to couple to the AC voltage source and configured to conduct current to the load when closed, wherein each switch in the plurality of switches is coupled to each other in parallel, and wherein the plurality of switches is coupled to the rectifier and the inverter in parallel;
   at least one controller configured to couple to the rectifier and the inverter; and
   a plurality of controllers, wherein each controller of the plurality of controllers is configured to couple to a respective switch in the plurality of switches, wherein the at least one controller and the plurality of controllers communicate with each other via at least two communication buses.

2. The UPS system of claim 1, wherein each switch in in the plurality of switches is rated to conduct current that corresponds to an output of the AC voltage source.

3. The UPS system of claim 1, wherein each switch in the plurality of switches is a static switch module (SSM).

4. The UPS system of claim 3, wherein each switch comprises a plurality of forced commutation devices.

5. The UPS system of claim 3, wherein each switch comprises a plurality of Integrated Gate-Commutated Thyristors (IGCTs).

6. The UPS system of claim 4, wherein each controller of the plurality of controllers is configured to control an operation of each of the plurality of forced commutation devices in each switch.

7. The UPS system of claim 1, comprising an isolation switch configured to couple between each switch of the plurality of switches and an input terminal configured to couple to the AC voltage source.

8. The UPS system of claim 1, wherein the at least one controller is configured to send a first signal to the rectifier and the inverter, wherein the first signal is configured to conduct current from the AC voltage source to the load via the rectifier and the inverter, and wherein the plurality of controllers is configured to send a second signal to each switch in the plurality of switches, wherein the second signal is configured to open each switch when a quality of an AC voltage output by the AC voltage source is not within tolerance levels.

9. The UPS system of claim 1, wherein the plurality of switches is configured to simultaneously provide power to the load from the AC voltage source.

10. The UPS system of claim 1, wherein the plurality of switches is configured to cyclically provide power to the load from the AC voltage source.

11. A method, comprising:
   monitoring a plurality of currents conducting through a plurality of switches, wherein each switch is configured to couple an AC voltage source to a load;
   determining whether at least one switch in the plurality of switches has failed; and
   sending a signal to a plurality of controllers to provide power to the load using at least one rectifier and at least one inverter when at least one switch in the plurality of switches fails, wherein the plurality of controllers comprise:
      a first set of the controllers each coupled to the at least one rectifier and the at least one inverter; and
      a second set of the controllers each coupled to a respective switch in the plurality of switches.

12. The method of claim 11, wherein determining whether the at least one switch in the plurality of switches has failed comprises receiving an indication that a current is conducting through the at least one switch when the at least one switch is open.

13. The method of claim 11, wherein determining whether the at least one switch in the plurality of switches has failed comprises receiving an indication that at least two of the plurality of currents differ substantially from each other when each switch in the plurality of switches is closed.

14. The method of claim 11, comprising:
determining whether at least one of the plurality of currents is being back fed into at least one of switch of the plurality of switches; and
providing power to the load using the at least one rectifier and the at least one inverter when the at least one switch in the plurality of switches fails, wherein the at least one rectifier and the at least one inverter is coupled to the plurality of switches in parallel.

15. The method of claim 11, wherein providing power to the load using the at least one rectifier and the at least one inverter comprises switching off each switch in the plurality of switches, wherein each switch switches off using at least one forced commutation device.

16. A controller, configured to:
couple to a first rectifier and to a first inverter, wherein the first rectifier is configured to couple to an AC voltage source, and wherein the first inverter is configured to output a controllable AC voltage to a load;
communicate with a plurality of other controllers via a plurality of communication buses, wherein each of the plurality of other controllers is configured to respectively couple to:
a second rectifier and a second inverter, wherein the second rectifier is configured to couple to the second inverter, and wherein the second rectifier and the second inverter is configured to couple to the first rectifier and the first inverter in parallel;
a switch configured to couple to the AC voltage source and configured to provide an AC voltage from the AC voltage source to the load; or
a combination thereof;
send a signal to a respective other controller coupled to the switch, wherein the signal is configured to open the switch when a quality of the AC voltage is not within tolerance levels, wherein the switch comprises a plurality of forced commutation devices, and wherein a respective other controller of the plurality of other controllers is configured to control an operation of the plurality of forced commutation devices.

17. The controller of claim 16, wherein the switch is rated to conduct current that corresponds to an output of the first rectifier and the first inverter.

18. The controller of claim 16, wherein the controller is configured to send a signal to the first rectifier and the first inverter to conduct current from the AC voltage source to the load via the first rectifier and the first inverter when a quality of the AC voltage is not within tolerance levels.

* * * * *